Patented Sept. 4, 1923.

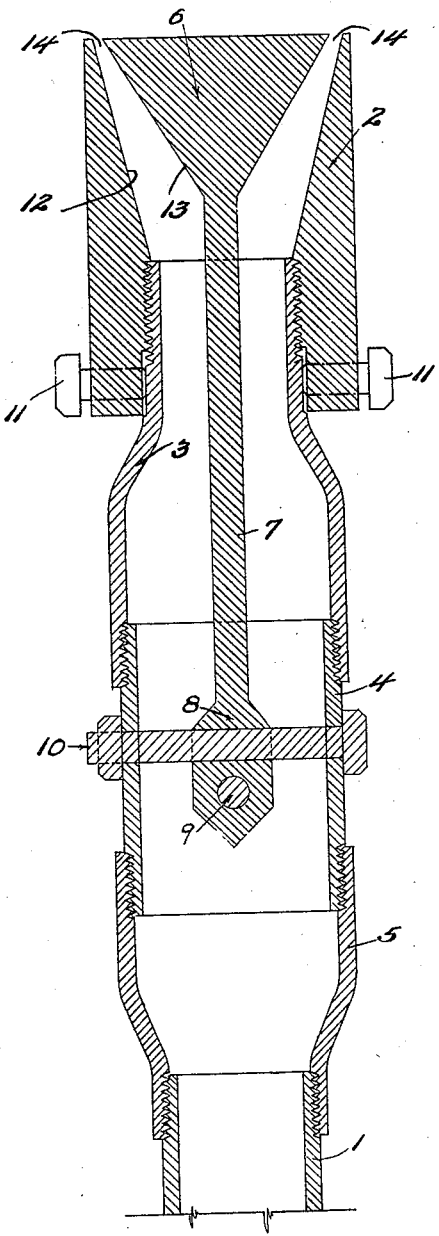

1,466,965

UNITED STATES PATENT OFFICE.

AUGUST GREY SAVAGE, OF ELDORADO, ARKANSAS.

BLOWER NOZZLE.

Application filed October 19, 1922. Serial No. 595,587.

*To all whom it may concern:*

Be it known that I, AUGUST GREY SAVAGE, a citizen of the United States, and residing at Eldorado, county of Union, and State of Arkansas, have invented certain new and useful Improvements in Blower Nozzles, of which the following is a specification.

This invention relates to blower nozzles, particularly to nozzles designed to blow or spray steam into the stack of a locomotive for the purpose of inducing a draft.

The principal objects of the invention are to produce a simple and cheap nozzle which will produce an effective draft with economical use of steam, thus effecting considerable saving in fuel.

Other objects will be evident from the annexed specification and from the drawing, which shows a longitudinal section through a nozzle constructed in accordance with my invention.

In the drawings, 1 represents the usual blow pipe of a locomotive to which the nozzle is attached. The nozzle is of generally tubular shape and comprises a nozzle tip 2, a reducer 3, an enlarged nipple or connector 4 and a reducer 5 which attaches the whole to the blow pipe. Disposed concentrically within the nozzle is a spreader 6 which serves the double purpose of restricting the outlet and spraying the steam over a large area, as will presently be explained.

The spreader is supported and held firmly in position by means of a stem 7 having a supporting end 8. This end is enlarged in order to permit the passing therethrough of mutually perpendicular fastening members 9 and 10 without weakening the support. The fastening members are preferably of pin type and are secured in the nipple and in any suitable manner. The nipple is larger than the blow pipe and nozzle sections in order to give an unrestricted fluid passage around the enlarged supporting end 8.

The nozzle tip has a divergent conical inner wall 12 and the spreader also has a conical wall 13. These walls are so arranged that they converge toward each other to produce a restricted outlet 14. The nozzle tip is preferably threaded on the reducer 3 so that it may be adjusted axially with respect to the spreader to adjust the outlet 14, and is provided with one or more set screws 11 by which it may be locked securely in position.

The restricted outlet maintains a high steam pressure at the point of efflux, hence a high velocity is obtained which produces a strong draft. The steam leaves the nozzle in a conical sheet, at an angle to the axis somewhere between the angles of the two walls 12 and 13. Hence these angles are suitably chosen to spread the steam over the required area to give the desired draft through a given stack.

It is to be understood that the invention is not limited to the specific construction or application described in detail for the sake of illustration, but includes modifications and changes which come within the scope of the appended claims.

Having thus described the invention, what I claim as new and desire to secure by Letters Patent is:

1. In a device of the class described, in combination, a nozzle tip having a diverging inner wall, a spreader disposed concentrically within the nozzle tip and having a wall, diverging from a single unitary supporting stem said walls being convergent toward each other to produce a restricted fluid outlet, means for adjusting the nozzle tip axially, and means for locking it in adjusted position.

2. In a blower nozzle in combination, means for securing the nozzle to a blower pipe, a nozzle tip, enlarged connecting means between the tip and the securing means, a spreader in the nozzle tip having a supporting stem, an enlarged supporting base on said stem, and means for securing the stem concentrically within the nozzle tip comprising a pair of transverse pins passing through the connecting means and through the enlarged base.

3. In a blower nozzle, in combination, a nozzle tip, means for connecting the tip to a blower pipe, including an enlarged connecting section, a conical spreader in the tip having a unitary, concentric supporting stem, and an enlarged base on the stem adapted to be supported from the enlarged connecting section.

In testimony whereof I hereunto affix my signature.

AUGUST GREY SAVAGE.